(12) United States Patent
Hendrix

(10) Patent No.: US 7,163,402 B1
(45) Date of Patent: Jan. 16, 2007

(54) GAME FOR STIMULATING READING INTEREST

(76) Inventor: Elizabeth Hendrix, 2706 31st. Ave. Way, Northport, AL (US) 35476

( * ) Notice: Subject to any disclaimer, the term of this patent is extended or adjusted under 35 U.S.C. 154(b) by 217 days.

(21) Appl. No.: 10/965,395

(22) Filed: Oct. 14, 2004

(51) Int. Cl.
*G09B 17/00* (2006.01)
(52) U.S. Cl. ...................... 434/178; 434/128
(58) Field of Classification Search ........... 434/128, 434/178, 236; 273/236, 242, 243, 248
See application file for complete search history.

(56) References Cited

U.S. PATENT DOCUMENTS

| | | | |
|---|---|---|---|
| 3,593,431 A * | 7/1971 | Candido et al. | 434/343 |
| 4,216,594 A * | 8/1980 | Farley et al. | 434/236 |
| 4,684,135 A * | 8/1987 | Bouchal | 273/269 |
| 5,183,258 A | 2/1993 | Lerke | |
| 5,277,586 A | 1/1994 | Branch | |
| 5,435,726 A * | 7/1995 | Taylor | 434/128 |
| 5,895,219 A | 4/1999 | Miller | |
| 5,951,297 A | 9/1999 | Schwartz | |
| 6,120,296 A | 9/2000 | Lim | |
| 6,126,544 A * | 10/2000 | Kojima | 463/31 |
| 6,789,767 B1 * | 9/2004 | Mueller et al. | 273/236 |

* cited by examiner

*Primary Examiner*—Kurt Fernstrom
(74) *Attorney, Agent, or Firm*—Gerald M. Walsh; Kenneth M. Bush; Bush IP Law Group, LLC

(57) ABSTRACT

A game for stimulating interest in reading has a game board with coded spaces arranged in a circular path and a written story with consecutive portions. Players are given a fixed number of points and read a first portion of the story. They roll dice to determine the number of spaces they advance from a starting point on the circular path. Each player makes a prediction as to what occurs next in the story if the player lands on a space that instructs the player to make a prediction. One or more players making a wrong prediction lose a point (game card). The process is repeated for each portion of the story until the story is completely read, wherein the winner of the game is the player having the most points (game cards).

18 Claims, 1 Drawing Sheet

GAME FOR STIMULATING READING INTEREST

BACKGROUND OF THE INVENTION

1. Field of the Invention

The present invention relates to the field of educational board games, and more particularly to a board game for stimulating interest in reading.

2. Technical Background

Reading literature for some people is a very rewarding, entertaining, educational, stimulating and pleasurable experience. For a majority of people, however, this is not the case. During the school years, reading is mostly a passive learning process, which often can be boring and promote thoughtless regurgitation. Under these circumstances, reading is perceived as a chore and burden. On the other hand, reading would be more enjoyable and interesting if it would lead to increased comprehension skills, critical thinking, and communication skills.

It is known that the process of predicting during reading promotes interest in reading and critical thinking. For example, during the reading of a novel, if the reader is continuously trying to predict the future events and outcomes of the story, the process of reading becomes interesting and stimulating. The more this prediction process occurs the more critical thinking skills and communication skills are developed, in addition to a resulting sustained and growing interest in the very act of reading. However, there are no effective methods or devices to promote the prediction process during reading. Such a method and or device would be beneficial because interest in reading would not only be stimulated in the art of fiction literature but would carry over to non-fiction literature including science and technology.

Numerous educational games are known to teach one how to read and to develop reading skills. The advantage of educational games is that they motivate a person to perform the work tasks that lead to the development of a particular skill. At present, there are no effective game methods or systems to promote interest in the act of reading or to stimulate predicting activity during reading.

SUMMARY OF THE INVENTION

The present invention is a game and method to stimulate interest in reading. A story is provided with a series of consecutive elements of varying predictability. Players read a first of a series of portions of the story and are given several points in the form of game cards and are also given question cards. Each player rolls one or more dice. The number indicated on the dice determines the space on the game board to which the player will advance. Each space will have certain instructions or commands; one of which is to make a prediction as to what will occur next in the story. The next portion of the story is read and players whose predictions were wrong lose a card. This process is repeated until the story is completely read by the players, wherein the player with the most cards is the winner.

An advantage of the present invention is an enjoyable game that promotes interest in reading.

Another advantage is a reading game that promotes active reading skills and reading performance.

Another advantage is a reading game for readers of all ages.

Another advantage is a reading game that is simple and inexpensive.

Another advantage is a reading game that promotes active reading in fiction, non-fiction, technical, and scientific literature.

DETAILED DESCRIPTION OF THE INVENTION

Figure 1:
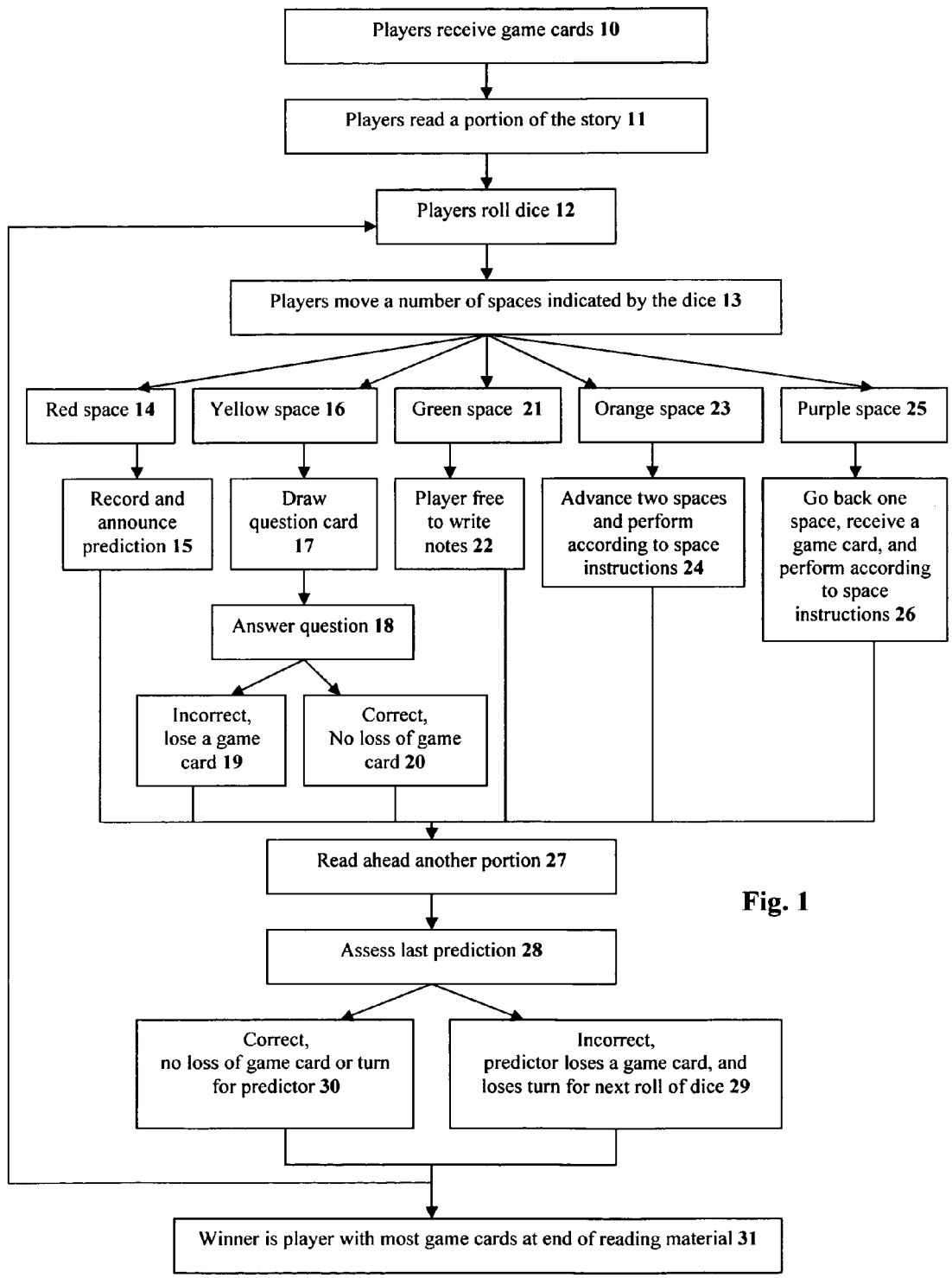
FIG. 1 illustrates the steps of the game and method of the present invention.

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Passive reading has a negative impact on reading interest, self-perception, comprehension skills, recollection, enjoyment, and creates the perception that the act of reading is a chore and burden. Active reading, on the other hand, serves as a catalyst for interest in reading, positive academic and social attitudes, better comprehension skills, improved critical thinking, and enjoyment in the act of reading. The present invention can facilitate active reading over a short period of time and will increase readers' critical thinking, skills, reading comprehension, and interest in the act of reading.

The present invention uses the process of predicting what occurs next in a story in a game format. The desire to win the game provides an incentive to predict what comes next in the story. The process of predicting makes the act of reading interesting and enjoyable. The game and method of the present invention, thus, increases interest in the act of reading.

FIG. 1 shows the elements of the game and method of the present invention. In a preferred embodiment, the game uses a game board having a circular pathway on its surface. The pathway is formed of a plurality of defined spaces. For example, the pathway may be composed of 40 spaces or segments. Each space or segment is identified by one of five possible designations, such as, for example, numbers or colors. For purposes of illustration the spaces will be colored red, yellow, green, orange, or purple. The game also uses game cards equivalent to points, question cards, dice, and game pieces to identify each player.

One of the spaces is a starting space. Each player chooses a game piece and puts it on ""start."" In a first step 10, each player receives a copy of a story or novel or narrative and reads a first portion of the story, for example, the first three pages (step 11). The players then roll the dice (step 12) and advance their game pieces a number of spaces corresponding to the number on the dice (step 13).

If a player lands on a red space 14, the player discloses to the other players his or her prediction as to what is going to happen next in the story (step 15). If a player lands on a yellow space 16 the player will draw a question card (step 17) and answer the questions on the card related to the story (step 18). If the answer is wrong or inadequate, the player will lose a game card (step 19). If the answer is correct, there will be no loss of a game card (step 20). The other players evaluate and determine whether the answer is correct or adequate based upon the reading material.

If a player lands on a green space 21, there are no conditions for the player, and the player is free to take"

written notes (step 22). If a player lands on an orange space 23, the player will advance two spaces and perform whatever the new space instructs him or her to do (step 24). If a player lands on a purple space 25, the player will go back one space, receive another game card, and perform whatever the new space instructs him or her to do (step 26).

After reading the next portion of the story, for example, the next two or three pages (step 27), the players will evaluate the last prediction disclosed by a player (step 28). If the prediction was wrong, the player will miss the next turn of throwing the dice and playing, and the player will also lose one game card (step 29). If the prediction was correct, the player may continue to play with no loss of a game card (step 30).

The process of the game is, thus, repeated by again throwing the dice (step 12) and advancing around the board (steps 13–30). The winner of the game is the player with the most game cards, which are equivalent to points, after all portions of the story have been read (step 31). Any suitable type of questions can be used on the question cards. For example, who is the author; what is the setting of the story; who are all the characters in the story; what is the plot of the story?; what is the perspective of the author; why does each character behave as described?; how does the story end; etc.? Question cards may also request information from players. For example, the player may be asked to retell the story, evaluate other players' predictions, disclose his or her prediction, etc.

The board game of the present invention can be constructed and used as a virtual board game in electronic media, such as, for example, a software program in a computer displayed on a monitor or video screen. All of the elements of the game, including the story and random number generator, can be included in a software program by methods well known in the art, and can be played on a computer with typical input and output devices known in the art.

Players who have played this game several times have indicated that they believe their reading skills have improved because they are actively reading the material, while having fun with reading. They further indicate that these skills are transferable to other reading materials outside of the game context. In a classroom setting, the Inventor administered a Nelson-Denny reading test to 13 students before the reading game of the present invention was played, and administered the test again after several games were played during a school semester. The Nelson-Denny test measures vocabulary development, comprehension, and reading rate. The results of the test are shown below:

|  | Pre-test Score | Pre-test Grade Level | Post-test Score | Post-test Grade level | Score Increase | Grade Level Increase |
| --- | --- | --- | --- | --- | --- | --- |
| Mean | 31.2 | 4.6 | 60.5 | 8.8 | 29.2* | 4.2* |
| SE | 2.7 | 0.3 | 5.6 | 0.9 | 5.3 | 0.9 |

*significantly different from zero, $p < .05$

Application of the game of the present invention increased reading scores by 93% and reading grade level by 91%. These results illustrate that the use of the prediction process in the game setting of the present invention significantly increases reading performance. Based upon interviews with the participating students, the improvements are related to an improved ability to read actively with interest and enjoyment.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the game of the present invention can be played in a variety of settings, such as, for example, a psychic setting wherein each game player plays the role of a psychic with a crystal ball to focus the players' attention, the game cards serving as "psychic power cards", and the question cards serving as fortune telling cards. Any kind of number generator may be used besides dice. Numbers or shapes and the like can be used to identify the spaces instead of colors. Any type of story can be used, such as a mystery, an adventure, a love story, a biography, a documentary, or a historical narrative. The game of the present invention can be created and used in any kind of graphic or visual media, such as, for example, a computer generated game displayed on a computer monitor and the like.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A method of stimulating interest in reading, comprising the steps of:
 a) providing a written story having designated consecutive portions;
 b) providing a game with a game board, said game board having a circular pathway on said game board's surface, said circular pathway consisting of coded spaces;
 c) providing players of said game an initial number of points;
 d) reading a first portion of said written story;
 e) generating random numbers to determine the number of coded spaces players will advance around said circular pathway;
 f) making a prediction as to what will happen next in said written story if said player has advanced to a coded space instructing said player to make said prediction;
 g) reading the next portion of said written story and removing a point from one or more players whose predictions are incorrect; and
 h) repeating steps e through g until all portions of the written story have been read, wherein the winner of said game is the player with the most points.

2. The method of claim 1 further comprising the step of answering one or more questions about said story if said player has advanced to a coded space instructing said player to answer one or more questions, said player losing a point if said answer is incorrect.

3. The method of claim 1 wherein said player loses a turn to play in a next consecutive portion of said story if said player's prediction is incorrect.

4. The method of claim 1 wherein said method is implemented in a software program and computer.

5. A method of stimulating interest in reading, comprising the steps of:
 a) providing a written story having designated consecutive portions;

b) providing a game with a game board, said game board having a circular pathway on said game board's surface, said circular pathway consisting of coded spaces;
c) providing players of said game an initial number of points;
d) reading a first portion of said written story;
e) generating random numbers to determine the number of coded spaces players will advance around said circular pathway;
f) making a prediction by a player as to what will happen next in said written story if said player has advanced to a coded space instructing said player to make said prediction;
g) answering one or more questions about said story if said player has advanced to a coded space instructing said player to answer one or more questions, said player losing a point if said answer is incorrect;
h) reading the next portion of said written story and removing a point from one or more players whose predictions are incorrect; and
i) repeating steps e through h until all portions of the written story have been read, wherein the winner of said game is the player with the most points.

6. The method of claim 5 wherein said player loses a turn to play in a next consecutive portion of said story if said player's prediction is incorrect.

7. The method of claim 6 wherein said method is implemented in a software program and computer.

8. The method of claim 1 wherein said points are represented by game cards.

9. The method of claim 5 wherein said points are represented by game cards.

10. A method of stimulating interest in reading, comprising the steps of:
a) providing a written story having designated consecutive portions;
b) providing a game with a game board, said game board having a pathway on said game board's surface, said pathway consisting of coded spaces;
c) providing players of said game an initial number of points;
d) reading a first portion of said written story;
e) generating random numbers to determine the number of coded spaces players will advance around said pathway;
f) making a prediction as to what will happen next in said written story if said player has advanced to a coded space instructing said player to make said prediction;
g) reading the next portion of said written story and removing a point from one or more players whose predictions are incorrect; and
h) repeating steps e through g until all portions of the written story have been read, wherein the winner of said game is the player with the most points.

11. The method of claim 10 further comprising the step of answering one or more questions about said story if said player has advanced to a coded space instructing said player to answer one or more questions, said player losing a point if said answer is incorrect.

12. The method of claim 10 wherein said player loses a turn to play in a next consecutive portion of said story if said player's prediction is incorrect.

13. The method of claim 10 wherein said method is implemented in a software program and computer.

14. The method of claim 10 wherein said points are represented by game cards.

15. A method of stimulating interest in reading, comprising the steps of:
a) providing a written story having designated consecutive portions;
b) providing a game with a game board, said game board having a pathway on said game board's surface, said pathway consisting of coded spaces;
c) providing players of said game an initial number of points;
d) reading a first portion of said written story;
e) generating random numbers to determine the number of coded spaces players will advance around said pathway;
f) making a prediction by a player as to what will happen next in said written story if said player has advanced to a coded space instructing said player to make said prediction;
g) answering one or more questions about said story if said player has advanced to a coded space instructing said player to answer one or more questions, said player losing a point if said answer is incorrect;
h) reading the next portion of said written story and removing a point from one or more players whose predictions are incorrect; and
i) repeating steps e through h until all portions of the written story have been read, wherein the winner of said game is the player with the most points.

16. The method of claim 15 wherein said player loses a turn to play in a next consecutive portion of said story if said player's prediction is incorrect.

17. The method of claim 16 wherein said method is implemented in a software program and computer.

18. The method of claim 15 wherein said points are represented by game cards.

* * * * *